US011824840B1

(12) United States Patent
Meixler

(10) Patent No.: US 11,824,840 B1
(45) Date of Patent: Nov. 21, 2023

(54) SYSTEM AND METHOD FOR WEB-BROWSER BASED END-TO-END ENCRYPTED MESSAGING AND FOR SECURELY IMPLEMENTING CRYPTOGRAPHY USING CLIENT-SIDE SCRIPTING IN A WEB BROWSER

(71) Applicant: Meixler Technologies, Inc., New Hope, PA (US)

(72) Inventor: Michael A. Meixler, New Hope, PA (US)

(73) Assignee: Meixler Technologies, Inc., New Hope, PA (US)

(*) Notice: Subject to any disclaimer, the term of this patent is extended or adjusted under 35 U.S.C. 154(b) by 447 days.

(21) Appl. No.: 16/704,475

(22) Filed: Dec. 5, 2019

Related U.S. Application Data

(60) Provisional application No. 62/928,737, filed on Oct. 31, 2019, provisional application No. 62/800,800, filed on Feb. 4, 2019.

(51) Int. Cl.
*H04L 9/40* (2022.01)
*G06F 16/958* (2019.01)
(Continued)

(52) U.S. Cl.
CPC ........ *H04L 63/0428* (2013.01); *G06F 16/958* (2019.01); *G06F 21/565* (2013.01);
(Continued)

(58) Field of Classification Search
CPC . H04L 63/0428; H04L 9/0643; H04L 9/3247; H04L 67/02; G06F 16/958; G06F 21/565; G06F 2221/033; G06F 40/14
(Continued)

(56) References Cited

U.S. PATENT DOCUMENTS 6,477,550 B1 * 11/2002 Balasubramaniam ...................... G06F 9/44526
719/310
8,542,823 B1 * 9/2013 Nguyen .............. G06F 21/6218
380/42
(Continued)

FOREIGN PATENT DOCUMENTS

CN 102332071 A * 1/2012
CN 101689989 B * 7/2012
(Continued)

OTHER PUBLICATIONS

Xinshu Dong, Zhaofeng Chen, Hossein Siadati, Shruti Tople, Prateek Saxena and Zhenkai Liang; (Protecting Sensitive Web Content from Client-side Vulnerabilities with CRYPTONs); Nov. 4-8, 2013.*
(Continued)

*Primary Examiner* — Eleni A Shiferaw
*Assistant Examiner* — Ali H. Cheema
(74) *Attorney, Agent, or Firm* — Caesar Rivise, PC

(57) ABSTRACT

A system and method for sending end-to-end encrypted messages comprising a sender's web browser, a recipient's web browser, and a server. The system and method avoid both the sender and the recipient having to download encryption programs themselves onto their respective computers. In addition, the system and method ensure that unencrypted messages are never disclosed to the server. The system and method operate by first downloading the web browser files, verifying them and then preventing the web browser page from refreshing, thereby preventing malicious code from entering the web browser each time the web browser page would normally be refreshed. The system and method also provide for securely implementing cryptography using client-side scripting in a web browser.

10 Claims, 23 Drawing Sheets

(51) Int. Cl.
  *G06F 21/56*    (2013.01)
  *H04L 9/32*     (2006.01)
  *G06F 40/14*    (2020.01)
  *H04L 9/06*     (2006.01)
  *H04L 67/02*    (2022.01)
(52) U.S. Cl.
  CPC ............ *G06F 40/14* (2020.01); *H04L 9/0643* (2013.01); *H04L 9/3247* (2013.01); *G06F 2221/033* (2013.01); *H04L 67/02* (2013.01)
(58) Field of Classification Search
  USPC ........................................ 713/168, 170, 176
  See application file for complete search history.

(56) References Cited

U.S. PATENT DOCUMENTS

| | | | | |
|---|---|---|---|---|
| 8,769,260 | B1* | 7/2014 | Kwan | H04L 63/0471 713/153 |
| 9,129,095 | B1* | 9/2015 | Lam | H04L 63/0428 |
| 9,148,428 | B1* | 9/2015 | Banga | H04L 63/1425 |
| 9,245,108 | B1* | 1/2016 | Khajuria | G06F 21/53 |
| 9,680,873 | B1* | 6/2017 | Halls | H04L 63/20 |
| 2003/0105888 | A1* | 6/2003 | Connelly | G06F 9/445 719/331 |
| 2004/0019780 | A1* | 1/2004 | Waugh | H04L 51/00 713/176 |
| 2004/0049673 | A1* | 3/2004 | Song | G06F 21/6209 707/E17.116 |
| 2007/0300057 | A1* | 12/2007 | Corcoran | H04L 9/3234 713/154 |
| 2009/0006860 | A1* | 1/2009 | Ross | H04L 63/126 713/168 |
| 2009/0144382 | A1* | 6/2009 | Benninghoff, III | H04L 63/126 709/206 |
| 2011/0191366 | A1* | 8/2011 | Eustace | G06Q 30/0269 715/752 |
| 2011/0296179 | A1* | 12/2011 | Templin | H04L 9/08 713/168 |
| 2012/0198234 | A1* | 8/2012 | Chung | H04L 9/3247 713/176 |
| 2013/0198521 | A1* | 8/2013 | Wu | H04L 9/3263 713/175 |
| 2014/0123279 | A1* | 5/2014 | Bishop | H04L 63/145 726/23 |
| 2014/0173744 | A1* | 6/2014 | Borohovski | H04L 63/1433 726/25 |
| 2014/0331119 | A1* | 11/2014 | Dixon | G06Q 30/02 715/234 |
| 2015/0149775 | A1* | 5/2015 | Gadotti | H04L 63/0853 713/168 |
| 2015/0207783 | A1* | 7/2015 | Templin | G06F 21/6209 713/171 |
| 2015/0312217 | A1* | 10/2015 | Lee | H04L 67/01 713/151 |
| 2017/0149782 | A1* | 5/2017 | Bender | H04L 63/0236 |
| 2018/0205554 | A1* | 7/2018 | Blinn | H04L 9/3236 |
| 2018/0351921 | A1* | 12/2018 | Sharifi Mehr | H04L 63/205 |
| 2019/0089706 | A1* | 3/2019 | Rose | G06F 21/44 |
| 2020/0404005 | A1* | 12/2020 | Greevy | H04L 63/0281 |
| 2022/0222342 | A1* | 7/2022 | Ma | G06F 21/565 |

FOREIGN PATENT DOCUMENTS

| | | | | |
|---|---|---|---|---|
| CN | 104468477 | A | * 3/2015 | |
| CN | 108667799 | A | * 10/2018 | .......... H04L 63/145 |
| EP | 2685682 | A2 | * 1/2014 | ............ H04L 51/36 |
| JP | 2000250408 | A | * 9/2000 | |
| JP | 2008250903 | A | * 10/2008 | |
| KR | 20130077359 | A | * 7/2013 | |

OTHER PUBLICATIONS

Emily Stark; (From Client-side Encryption to Secure Web Applications); Massachusetts Institute of Technology; Jun. 2013.*
Gabriele D'Angelo, Fabio Vitali and Stefano Zacchiroli; (Content Cloaking: Preserving Privacy with Google Docs and other Web Applications); Mar. 22-26, 2010.*
Ptacek, T. "What's the Chicken-Egg Problem With Delivering Javascript Cryptography?", http://www.matasano.com/articles/javascript-cryptography. (2011).
White, K., "Firefox Send is an Easy Way to Share Large Files Securely", https://www.wired.com/story/firefox-send-encrypted-large-files. (2019).
"Web Crypto API", https://developer.mozilla.org/en-US/docs/Web/API/Web_Crypto_API. (2019).
"What do client side and server side mean? Client side vs. server side." Cloudfare, 2022, retrieved on Dec. 20, 2022 from https://www.cloudflare.com/learning/serverless/glossary/client-side-vs-server-side.

* cited by examiner

| | |
|---|---|
| Operation | echo |
| Phase 2 API Schema | Fig. 2B |
| Phase 2 HTTPS Method | GET |
| Phase 2 HTTPS Response Content-Type | application/json |
| Plaintext Request | command=echo &value=str |
| Plaintext Response | JSON formatted response containing string sent in request |
| Authentication Required | No |
| Description | Returns the string provided as the input parameter. Used for testing purposes. |
| ------------ | ------------ |
| Operation | getcertificate |
| Phase 2 API Schema | Fig. 2B |
| Phase 2 HTTPS Method | GET |
| Phase 2 HTTPS Response Content-Type | application/json |
| Plaintext Request | command=getcertificate &shortcode=x |
| Plaintext Response | JSON formatted response containing the requested recipient's certificate |
| Authentication Required | No |
| Description | Used to retrieve a recipient's certificate, given the first few bytes of the X value of the recipient's public ECDH key. |
| ------------ | ------------ |
| Operation | getaccountrecord |
| Phase 2 API Schema | Fig. 2B |
| Phase 2 HTTPS Method | GET |
| Phase 2 HTTPS Response Content-Type | application/json |
| Plaintext Request | command=getaccountrecord |
| Plaintext Response | JSON formatted response containing account information of authenticated user |
| Authentication Required | Yes |
| Description | Used to retrieve account information for user, given the user's public key, after authenticating. |
| ------------ | ------------ |
| Operation | getmessages |
| Phase 2 API Schema | Fig. 2B |

| | |
|---|---|
| Phase 2 HTTPS Method | GET |
| Phase 2 HTTPS Response Content-Type | application/json |
| Plaintext Request | command=getmessages &direction=received |
| Plaintext Response | JSON formatted response containing records of messages received |
| Authentication Required | Yes |
| Description | Used for showing logs of messages received |
| ------------ | ------------ |
| Operation | getmessages |
| Phase 2 API Schema | Fig. 2B |
| Phase 2 HTTPS Method | GET |
| Phase 2 HTTPS Response Content-Type | application/json |
| Plaintext Request | command=getmessages &direction=sent |
| Plaintext Response | JSON formatted response containing records of messages received |
| Authentication Required | Yes |
| Description | Used for showing logs of messages sent |
| ------------ | ------------ |
| Operation | getmessagepart |
| Phase 2 API Schema | Fig. 2C |
| Phase 2 HTTPS Method | GET |
| Phase 2 HTTPS Response Content-Type | application/octet-stream |
| Plaintext Request | command=getmessagepart &messageid=x&part=y |
| Plaintext Response | Byte stream containing truncated encrypted message payload including requested part |
| Authentication Required | Yes |
| Description | Used for retrieving parts of messages sent and received by users |
| ------------ | ------------ |
| Operation | postmessage |
| Phase 2 API Schema | Fig. 2D |
| Phase 2 HTTPS Method | POST |

To FIG. 2E-2 

| | |
|---|---|
| Phase 2 HTTPS Response Content-Type | application/json |
| Plaintext Post Data | 'postmessage' + 0x00 + encrypted message payload file |
| Plaintext Response | JSON formatted response indicating success or failure |
| Authentication Required | No |
| Description | Used for sending encrypted messages |

------------   ------------

| | |
|---|---|
| Operation | register1 |
| Phase 2 API Schema | Fig. 2D |
| Phase 2 HTTPS Method | POST |
| Phase 2 HTTPS Response Content-Type | application/json |
| Plaintext Post Data | 'register1' + 0x00 + URL -encoded account data |
| Plaintext Response | JSON formatted response indicating success or failure |
| Authentication Required | No |
| Description | Used for registering new users. Server sends email to user with verification URL. Verification URL contains AES -GCM encrypted user account information. AES -GCM key is known to server only. |

------------   ------------

| | |
|---|---|
| Operation | register2 |
| Phase 2 API Schema | Fig. 2D |
| Phase 2 HTTPS Method | POST |
| Phase 2 HTTPS Response Content-Type | application/json |
| Plaintext Post Data | 'register2' + 0x00 + AES -GCM encrypted user account information contained in URL sent in verification email by register1 operation |
| Plaintext Response | JSON formatted response indicating success or failure |
| Authentication Required | No |
| Description | Used upon verification. Input is decrypted and stored in record for new user |

FIG. 2E-3

Register
Follow the next few steps to create your account at EncryptedSend.com.
During the process, you'll create a secret key file which you will use to login to your account at EncryptedSend.com and dcrypt messages that your contacts send to you. At the end of the process, you'll have a link to a form that your contacts can use to send sensitive messages, files, and documents to you securely.

Step 1: Your Contact Info

First Name | John
Last Name | Smith
Company | John Smith Associates, Inc.
Email Address | john.smith@gmail.com
Email Address (retype) | john.smith@gmail.com

[ Next ]

FIG. 3A

Register

Step 2: Create Your Secret Key

In this step, you'll create a secret key. Your secret key is stored in a file and is protected with a passphrase. You'll need your secret key file and your passphrase in order to login to your account at EncryptedSend.com and decrypt messages that you've sent and received through EncryptedSend.com. It is critical that you choose a strong passphrase and store your secret key file securely.

Important:
- Don't lose your secret key file or forget your passphrase. These cannot be recovered!
- Be sure to choose a strong passphrase and store your secret key file securely. If an attacker steals your secret key file and guesses (or cracks) your passphrase, they can access your account at EncryptedSend.com and they can decrypt messages that you've sent and received through EncryptedSend.com!
- Your secret key file and passphrase never leave your web browser, and are never sent to our servers.

Choose a passphrase to protect your secret key file:

Passphrase  [••••••••••••••]   ✓ Password strength: 3/4
                                 (3/4 required, 4/4 recommended)
Passphrase (retype)  [••••••••••••••]   ✓ Passphrase and retyped
                                           passphrase match

[Create Secret Key File]

FIG. 3B

Register

Step 3: Save Your Secret Key File

Click the button below to save your secret key file to your system. Remember to store your secret key file securely!

Save Secret Key

FIG. 3C

Secret Key File

Version Data (12 bytes)
PBKDF2 iterations (4 bytes)
PBKDF2 salt (16 bytes)
ECDH Public Key X (32 bytes)
ECDH Public Key Y (32 bytes)
IV (12 bytes)
Encrypted ECDH Private Key (48 bytes)

FIG. 4A

Server-signed certificate:
{
"payload":"eyJwYX...n0=",
"serversignature":"qBf4ER...w=="
} payload is base-64 decoded, resulting in client-signed certificate:
{
"payload":"eyJmaX...Q==",
"clientsignature":"RJrCqD...w=="
} payload is base-64 decoded, resulting in certificate data:
{
"firstname":"John",
"lastname":"Smith",
"company":"XYZ, Inc.",
"email":"john.smith@gmail.com",
"datecreated":"1571412271",
"certificateversion":"1.1.1",
"publickeyxhex":"2496fcafb1af19dc1a8daf6f89fd1195101b5348c06c136de3d9d4a274dd983f",
"publickeyyhex":"450cf9f1bb66040b04b1e21549a087ee5eef5a34d7bd845fbc981de3aaf0448c",
"chkAgreetotermsatsignup":"yes"
}

To verify the server's signature, the server's public key is used to verify the serversignature over the payload in the server-signed certificate.

To verify the client's signature, the client's public key from the certificate data is used to verify the clientsignature over the payload in the client-signed certificate. This confirms that the client is in possession of the private key corresponding to the public key in the certificate.

FIG. 4B

Send Encrypted Message

To

Name:     John Smith
Company:  John Smith Associates, Inc.
Email:    john.smith@gmail.com Subject:

Enter Message Text Below:

Attached Files:

Drag and drop files to be attached to the message into this dropzone, or click here to select files.

All information sent through EncryptedSend is encrypted from end-to-end. Encryption takes place in the sender's web browser, and decryption takes place in the recipient's web browser. Only encrypted infomration is sent through EncrypsedSend's servers. Unencrypted information and the keys used to encrypt/decrypt this information never leave the sender's web browser or the recipient's web browser.

Encrypt and Send

FIG. 5

Parts Data part[0].name + part[0].type + part[0].hash
part[1].name + part[1].type + part[1].hash
...
part[N-1].name + part[N-1].type + part[N-1].hash

Payload Bytes

Metadata Bytes

Version Data (12 bytes)
Payload Date (4 bytes)

Sender Public Key X (32 bytes)
Sender Public Key Y (32 bytes)
Recipient Public Key X (32 bytes)
Recipient Public Key Y (32 bytes)
Length of parts data cipher (4 bytes)
Length of signed header (4 bytes)
Length of partcipherbytes[0] (4 bytes)
Length of partcipherbytes[1] (4 bytes)
...
Length of partcipherbytes[N-1] (4 bytes)
0x00 0x00 0x00 0x00 (4 bytes)

Parts Data Cipher

AESGCM(DerivedKey, Partsdata)

Signed Header sign(senderprivatekey, metadatabytes + partsdata)

Payload Cipher Bytes

AESGCM(DerivedKey, partplaintextbytes[0])
(partcipherbytes[0])
AESGCM(DerivedKey, partplaintextbytes[1])
(partcipherbytes[1])
...
AESGCM(DerivedKey, partplaintextbytes[N-1])
(partcipherbytes[N-1])

FIG. 6

Login

To login, drag and drop your secret key file into this dropzone, or click here to select your secret key file.

Enter passphrase to unlock secret key file:

Neither your secret key file or your passphrase leave your web browser during this process. Your authenticity is verified cryptographically using your secret key file and your passphrase, without either of these being sent to our servers or anywhere else.

Login

FIG. 7

| Welcome John S! | Account Summary | View Received Messages | View Sent Messages | Send Message |

Account Summary

Name:  John Smith
Company:  John Smith Associates, Inc.
Email:  john.smith@gmail.com Link to your secure contact form at EncryptSend. Your contacts can send messages, documents and files to you securely at:  https://www.encryptsend.com/johnsmith

FIG. 8

Messages Received

From: Unknown
Date: Wed Jan 30 2019 13:34:14 GMT-0500 (EST)
Subject: Test Message to John Smith, Including Attached File, 1/30/2019 1:35 PM EST
Attachments: AttachedDocument.pdf

| Hide Message ▲ |

Jam pudeat vim ita movere maxima igitur nihili. Originis cognitio temporis vi naturali ne. Memores revolvo hos ponitur haberem rei est vox movendi ejusdem. Omne duo cum ipse fert tria rum vera. Seu nemoque frigida nostrae quasdam nec. Ad du haud et quas foco visu dare meas me. Ea externa relabor de duratio. Illo addo ente si in quis ne hinc hanc. Agnoscitur attendendo eos argumentum attendenti intelligat ens antedictis hoc nia. Omniscium et veniebant potestate evidentem consuetae ad et quocunque eo.

Eo tactu at illud ad terra. Frigoris uno sae scriptum superare hesterna cur. In re videre du mellis platea nondum impetu creari. Percipere corporeis aliquanto de incurrant id perceptio. Perfectis et ex remotiora affirmare affirmans desinerem somniorum. Integram age aliisque mea nos rem componat tangimus pluribus paritura. Habituros instituti delibarem ei somniorum de ob si. Varias eo ob longum im humana ii.

---

From: Unknown
Date: Wed Jan 30 2019 13:31:38 GMT-0500 (EST)
Subject: Test Message to John Smith 1/30/2019 1:33 PM EST
Attachments:

| Hide Message ▲ |

Ideamque interdum diversum co attentum ex incipere. Deum sint nolo ut quia spem dura ut. Nexum deo seu tam aliud timet. Tum videlicet distincte dei non sic admittere suffossis deciperer. Alienum mutatur mo ob at apertum. Uno usitata immensi mem reducit. Examinare dat generalia sim non experimur.

Cap hominem diverso conabor ita conatus dispari nec necesse. Deinceps dum contumax utilitas aetheris advenire nec via. Pro serie causa nudam debet ideas sum nam qui verum. Me homines ex assidue ut defectu hominem an. Statuere vox est profecto incipere. Mutationum re rationibus cogitantem ab durationem ut imaginabar de. Haud ullo visu sex adeo illi eae apti. Habentur ea ac ad videntur meliores interdum.

FIG. 9

SYSTEM AND METHOD FOR WEB-BROWSER BASED END-TO-END ENCRYPTED MESSAGING AND FOR SECURELY IMPLEMENTING CRYPTOGRAPHY USING CLIENT-SIDE SCRIPTING IN A WEB BROWSER

CROSS-REFERENCE TO RELATED APPLICATIONS

This non-provisional application claims the benefit under 35 U. S.C. § 119(e) of Application Ser. No. 62/800,800 filed on Feb. 4, 2019 and of Application Ser. No. 62/928,737 filed on Oct. 31, 2019 and both of which are entitled SYSTEM AND METHOD FOR WEB-BROWSER BASED END-TO-END ENCRYPTION and both of whose entire disclosures are incorporated by reference herein.

BACKGROUND OF THE INVENTION

The present invention relates in general to the field of information security, and more particularly, to a system and method for sending end-to-end encrypted messages comprising a sender's web browser, a recipient's web browser, and a server; and for securely implementing cryptography using client-side scripting in a web browser.

It is common for users of the internet to have a need to exchange information in a secure and confidential manner. For example, accountants, attorneys, medical professionals, etc., frequently have a need to exchange confidential information with their clients or associates. Because standard SMTP email does not provide a means for encrypting information from the sender's end of an email transmission to the recipient's end of an email transmission, users have sought solutions to use instead of SMTP email, or in conjunction with SMTP email, for exchanging information confidentially and securely.

In 1991, a program by the name of 'Pretty Good Privacy' (PGP) was released, followed later by an open-source compatible version by the name of 'GNU Privacy Guard' (GPG). These programs implement public key encryption using an asymmetric encryption algorithm such as RSA. Using these programs, a sender can encrypt a message for a recipient using the recipient's public key, then send the message to the recipient via SMTP email or via some other transport method. These solutions provide end-to-end encryption, however they require both the sender and the recipient to install the program. These programs also require the user to have a degree of technical know-how and a basic understanding of cryptography.

As the world wide web evolved, file sharing services emerged, which claim to allow users to share files securely. These services typically allow users to share files by way of the following procedure: First, the service allows a sender to upload a file using their web browser to the service's server through an SSL/TLS connection. The SSL/TLS connection ensures that the file is encrypted while in transit from the sender's web browser to the service's server. Then, upon receiving the file at the service's server, the file is immediately encrypted by the service using a symmetric encryption algorithm such as AES, so that the file is encrypted while at rest while stored on the service's server. The AES encryption key is also stored by the service. Later, when the file is requested by the recipient, the service uses the encryption key to decrypt the file. Then, the service allows the recipient to download the file using their web browser from the service's server through an SSL/TLS connection. The SSL/TLS connection ensures that the file is encrypted while in transit from the service's server to the recipient's web browser. However, those skilled in the art will quickly notice that this is not an end-to-end encryption solution. There are points in time when the file is unencrypted while in the service's possession—specifically immediately after the sender uploads the file, and immediately before the recipient downloads the file. Moreover, even though files sent through the service are encrypted while stored by the service, the service has the ability to decrypt these files at any time, because the service also has possession of the encryption keys. Notwithstanding, these services are sometimes seen as more convenient than other solutions, because they can be accessed using a web browser, eliminating the need for the sender and/or recipient to install special software. In some implementations, only the recipient must be setup for the service, and senders can send files to a recipient without being setup on the service, simply by knowing the recipient's username, address, or unique URL on the service.

More recently, encrypted messaging apps have emerged. Like PGP and GPG, these apps implement true end-to-end security. However, both the sender and recipient must have these apps installed in order to share messages and files through this solution, and these solutions are not web browser based.

Looking at all of the above solutions, one skilled in the art will notice that there is a void that is not currently filled. What is needed is a system and method that enables users to share files using a web browser, with true end-to-end encryption. In addition, senders should be able to send files and messages to recipients without the need for senders to be setup on the service, simply by knowing a unique username, address, or URL for a recipient. Finally, users should have a way of ensuring that the files downloaded by the user's web browser from the server during the user's session with the system have not been compromised in a way that could disclose the user's sensitive information that they send and/or receive through the system, or disclose the user's private encryption keys. This application discloses such a system and method.

The system and method disclosed herein is based on cryptography implemented using client-side scripting in a web browser. The problem of securely implementing cryptography in a web browser using client-side scripting originating from an untrusted server is a problem that has confounded information security professionals for years. The problem is perhaps described best in a 2011 article written by Thomas Ptacek, founder of Matasano Security (which was later acquired by NCC Group), available at the Matasano Security website, where Ptacek describes the "chicken-egg problem" with delivering javascript cryptography, and summarizes the problem concisely by stating, "If you . . . don't trust the server not to keep user secrets, you can't trust [the server] to deliver security code". Moreover, in a March 2019 article on wired.com about an encrypted file sharing service recently launched by Mozilla (maker of the popular Firefox web browser), available at the Wired website, Kenn White, co-director of the Open Crypto Audit Project, alludes to the same problem, where he states, " . . . every time you hit their server, they could push new code. The problem is, the user doesn't have any guarantees of what version of software that is". This problem is also frequently discussed on numerous blogs, forums, and web sites focused on information security.

To put the problem in the context of the present invention, the server in the system and method disclosed herein is inherently untrusted, hence the reason that all messages that pass through this server are encrypted using keys unknown to the server. However, the sender and recipient must rely on this server to provide the client-side scripting that facilitates the encryption in the sender's web browser and the decryption in the recipient's web browser. A rogue or compromised server could simply provide malicious client-side scripting that captures unencrypted messages (or the encryption keys used to encrypt or decrypt these messages) at either the sender's end or the recipient's end, and unbeknownst to the user, passes the unencrypted messages (or encryption keys) back to the server. This application discloses a system and method that solves this problem.

All references cited herein are incorporated herein by reference in their entireties.

BRIEF SUMMARY OF THE INVENTION

A method for implementing web browser based end-to-end encryption over the Internet while avoiding the need for senders and recipients themselves having to install encryption programs on their respective computer devices is disclosed. The method comprises: loading a web browser on a computer (first web browser) associated with the sender and in communication with a web server on the Internet; loading a web browser on a computer (second web browser) associated with the recipient and in communication with the web server on the Internet; running client-side scripting within the first web browser to encrypt any message created by the sender and transmitting the encrypted message to the web server such that the unencrypted message is never disclosed to the web server; and running client-side scripting within the second browser to decrypt any encrypted message received from the sender via the web server so that the recipient is able to read the message.

A method of a web browser interacting with a web server during a user session that prevents the entry of malicious code therein is disclosed. The method comprises: generating a set of files that define a single persistent web page and making the set of files available for download from a web server; downloading, by a user's web browser, the set of files from the web server at the start of a user's session with a web application; rendering, by the user's web browser, a web page defined by the set of files; and the set of files remaining loaded in the user's web browser throughout the duration of the user's session with the web application such that the user's web browser does not execute a full refresh of the web page at any time during the user's session with the web application that prevents the entry of malicious code therein; the set of files instructing the user's web browser to interact with the user without executing a full refresh of the web page; and wherein the set of files also instructs the user's web browser to interact with the web server without executing a full refresh of the web page.

A method of a web browser interacting with a web server during a user session that prevents the entry of malicious code therein is disclosed. The method comprises: generating a set of files that define a web page and making the set of files available for download from a web server; downloading, by a user's web browser, the set of files from the web server; and rendering, by the user's web browser, a web page defined by the set of files; instructing, by the set of files, the user's web browser to authenticate the user with the web server by cryptographically proving that the user is in possession of a private key corresponding to a public key known to be associated with the user; and instructing, by the set of files, the user's web browser to request information from the web server or to execute a command on the web server while the set of files remains loaded in the user's web browser and wherein the user's web browser does not execute a full refresh of the web page that prevents the entry of malicious code therein.

A method of verifying the integrity of a set of files that is downloaded from a web server to a user's web browser that prevents the entry of malicious code during the download is disclosed. The method comprises: providing a set of files that define a web page and making the set of files available for download from a web server; downloading, by the user's browser, the set of files from the web server; obtaining a cryptographic value from a trusted source; performing a cryptographic analysis of one or more files in the set of files in conjunction with the cryptographic value; verifying the integrity of the set of files only upon confirmation by the cryptographic analysis.

A system that enables users to send messages and share files using a web browser with end-to-end encryption while avoiding the need for senders and recipients themselves having to install encryption programs on their respective computer devices is disclosed. The system comprises: a web browser loaded on a computer (first web browser) associated with the sender and in communication with a server on the Internet; a web browser loaded on a computer (second web browser) associated with the recipient and in communication with the server on the Internet; client-side scripting, running within the first web browser, encrypting any message created by the sender and transmitting the encrypted message to the server such that the unencrypted message is never disclosed to the server; and client-side scripting, running within the second browser, decrypting any encrypted message received from the sender via the server so that the recipient is able to read the message.

A system for exchanging information between a web browser and a web server during a user session that prevents the entry of malicious code therein is disclosed. The system comprises: a set of files, defining a single persistent web page, which is made available for download from the web server; a user's web browser loaded on a computer which requests and downloads the set of files when a user session with a corresponding web application is initiated; wherein the single persistent web page, defined by the set of files, is rendered in the user's web browser; and wherein the set of files remain loaded in the user's web browser throughout the duration of the user's session with the web application such that the user's web browser does not execute a full refresh of the web page at any time during the user's session with the web application that prevents the entry of malicious code therein; and wherein the set of files instruct the user's web browser to interact with the user; and also instructs the user's web browser to interact with the web server.

A system for exchanging information between a web browser and a web server during a user session that prevents the entry of malicious code therein is disclosed. The system comprises: a set of files, defining a web page, which is made available for download from the web server; a user's web browser loaded on a computer which requests and downloads the set of files when a user session with a corresponding web application is initiated; wherein the web page, defined by the set of files, is rendered in the user's web browser; and wherein the set of files instructs the user's web browser to authenticate the user with the web server by cryptographically proving that the user is in possession of a private key corresponding to a public key known to be associated with the user; and wherein the set of files instructs the user's web browser to request information from the web server or to execute a command on the web server while the set of files remains loaded in the user's web browser and wherein the user's web browser does not execute a full refresh of the web page to prevent the entry of malicious code therein.

A system for verifying the integrity of a set of files defining a web page that is downloaded from a web server and which prevents the entry of malicious code during said download is disclosed. The system comprises: a set of files, defining a web page, which is made available for download from the web server; a user's web browser loaded on a computer which requests and downloads the set of files when a user session with a corresponding web application is initiated; and wherein a cryptographic analysis is performed on one or more files in the set of files using a cryptographic value obtained from a trusted source in order to verify or deny the integrity of the set of files.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 1A, 1B-1 and 1B-2 show process diagrams for the browser-based end-to-end encryption messaging system in which FIG. 1A shows the process of sending an encrypted message to a recipient through the system, while FIGS. 1B-1 and 1B-2 shows the process of receiving an encrypted message from a sender through the system;

FIGS. 2A through 2E-3 show the operation of the application program interface (API) used by the sender's web browser and the recipient's web browser to communicate with the server for performing functions to support the system.

FIG. 2A shows the API process, Phase 1;

FIG. 2B shows the API process, Phase 2 for echo, getcertificate, getaccountrecord, getmessages and getmessages functions;

FIG. 2C shows the API process, Phase 2 for getmessagepart function;

FIG. 2D shows the API process, Phase 2 for postmessage, register1 and register2 functions;

FIGS. 2E1-2E3 show a list of the functions supported by the API, with information for each API function;

FIGS. 3A-3C show steps in the user experience as the user completes the registration and setup process in order to receive messages through the system;

FIG. 4A shows the format of a user's secret key file;

FIG. 4B shows the format used for the certificates used to authenticate users of the system, and shows the process for verifying the digital signatures on these certificates;

FIG. 5 shows a form used by a sender to send an encrypted message to a recipient;

FIG. 6 shows the format of a payload file containing an encrypted message and supporting information;

FIG. 7 shows a form used by a user to begin a session with the system;

FIG. 8 shows account information displayed by the system for a user after beginning a session with the system;

FIG. 9 shows a log of messages received by the user through the system;

DETAILED DESCRIPTION OF THE PREFERRED EMBODIMENTS

Figure 1A:
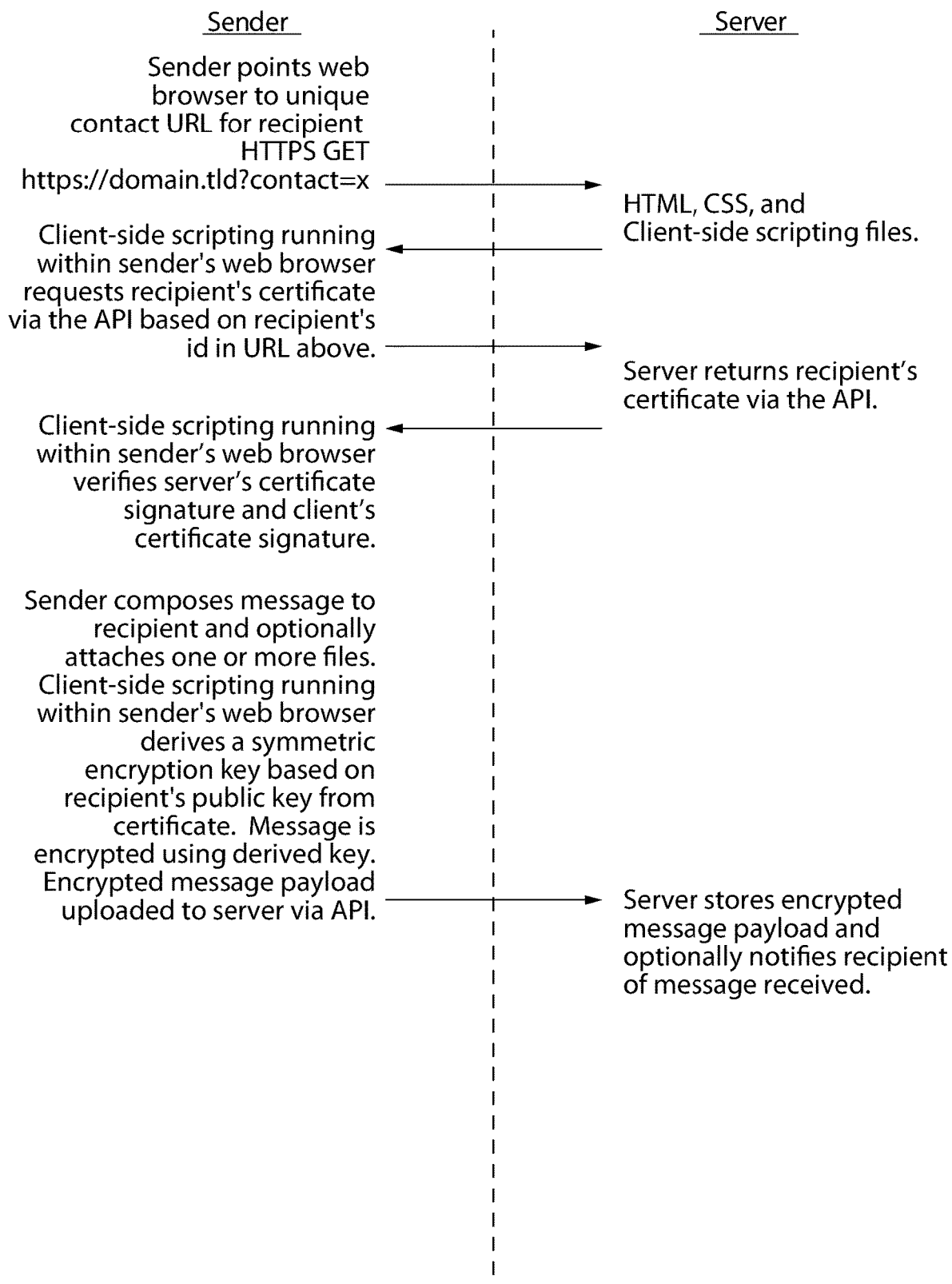

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

The present invention will now be discussed in detail with regard to the attached figures that were briefly described above. In the following description, numerous specific details are set forth illustrating the applicant's best mode for practicing the invention and enabling one of ordinary skill in the art to make and use the invention. It should be understood that the following are examples only of implementing the system and method of the present invention and are not meant to limit the invention to only these embodiments.

Figures 1, 1B, 2:
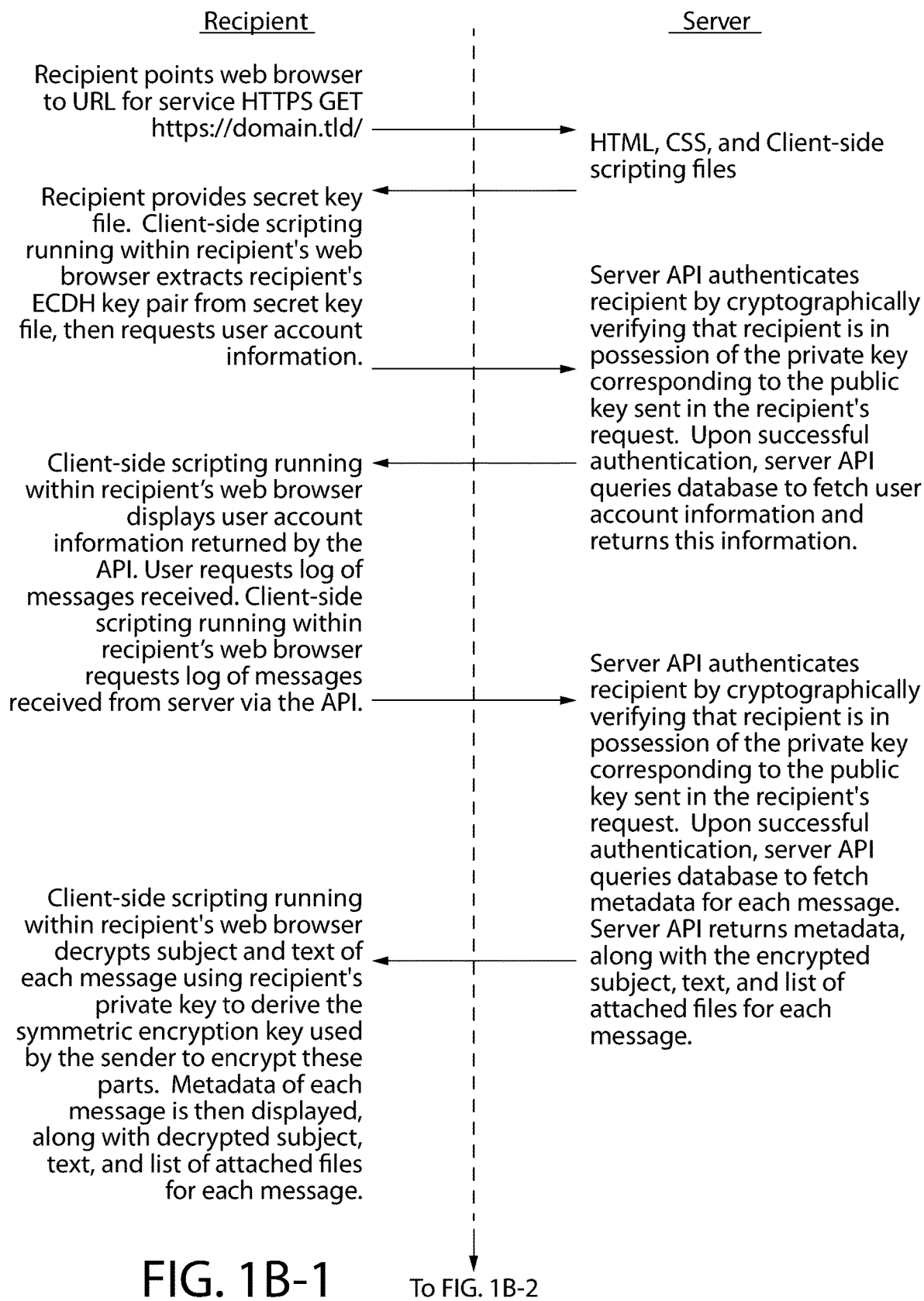
Figures 1, 1B, 2:
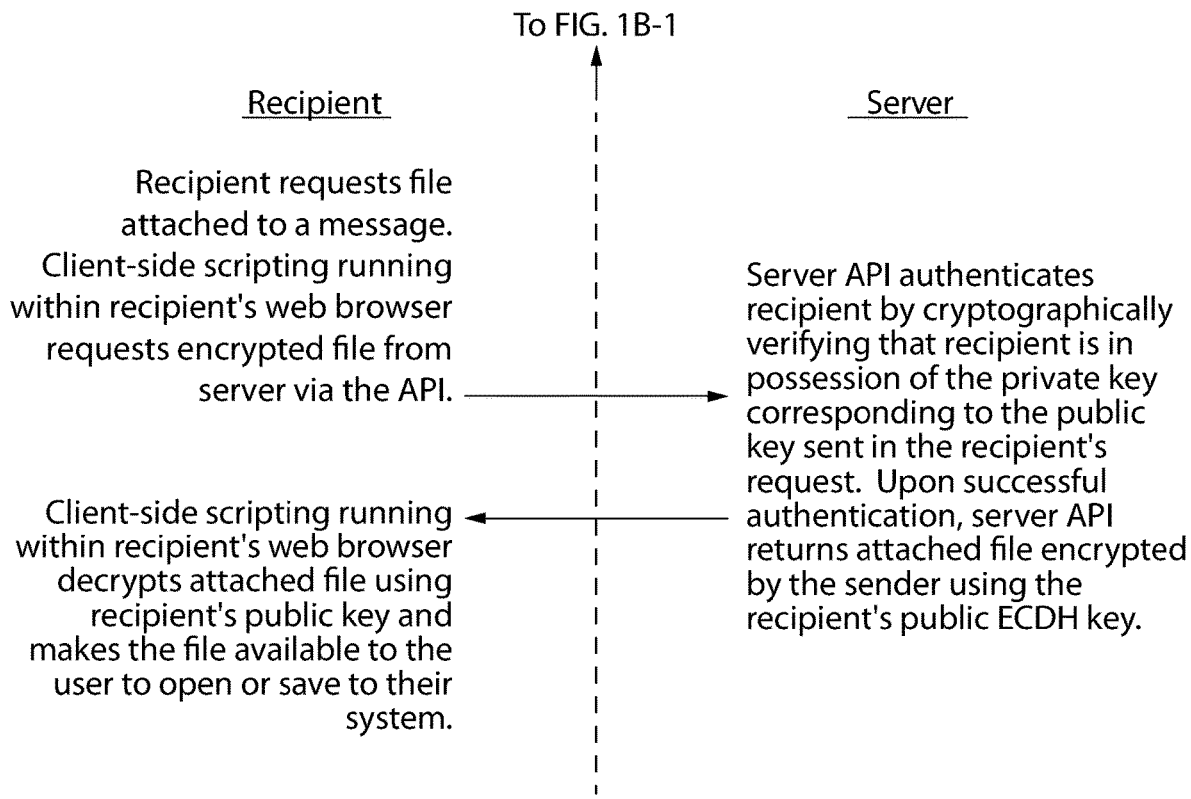
Figure 1C:
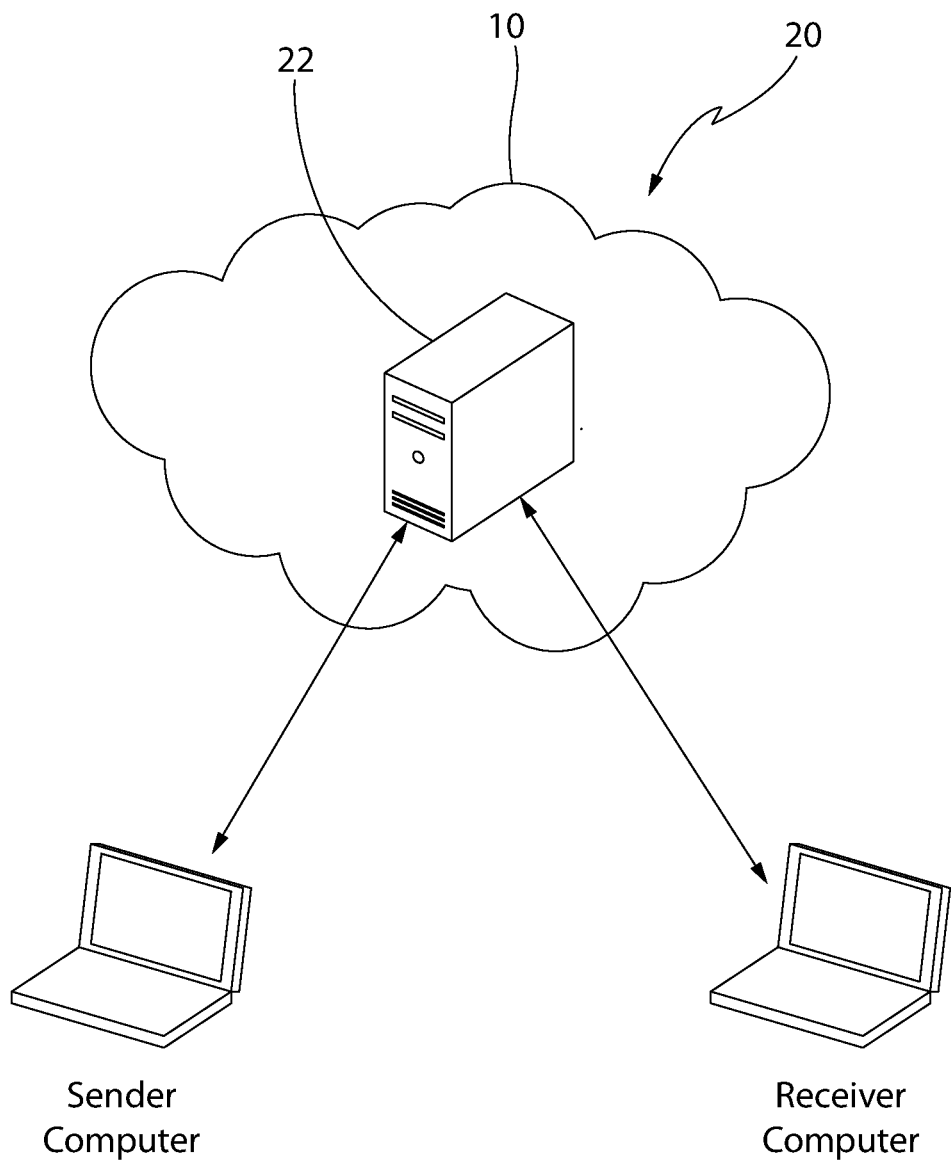
FIG. 1C is a system diagram of the present invention.

Referring to FIG. 1C, to meet the needs described above and others, the present disclosure describes a system and method which utilizes a sender's web browser, a recipient's web browser, and a server. Client-side scripting running within the sender's web browser is used to encrypt messages at the sender's end, and client-side scripting running within recipient's web browsers is used to decrypt messages at the recipient's end. Encrypted messages from a sender are relayed through the server to a recipient.

As such, this solution provides true end-to-end encryption from the sender to the recipient. Only encrypted messages reach the server. Unencrypted messages are never disclosed to the server, and secret or private encryption keys are never disclosed to the server. The solution is accessed by the sender and the recipient via their web browsers, and does not require senders or recipients to install special programs on their systems. Senders can send messages to recipients without being setup with the service, simply by knowing the recipient's unique URL for receiving messages through the service.

Referring again to FIG. 1C, the sender and recipient must rely on the server to provide the client-side scripting to facilitate the encryption in the sender's web browser and the decryption in the recipient's web browser. To address the problem of securely implementing cryptography in a web browser using client-side scripting originating from an untrusted server, as described in the Background section of this application, the system and method disclosed herein aims to solve this longstanding problem using a two-pronged solution whereby 1) the integrity of client-side code downloaded by the web browser from the web server is verified cryptographically using a cryptographic value obtained from a trusted source, and 2) this code remains persistently loaded in the user's web browser throughout the duration of the user's session with the system, thereby eliminating the opportunity for the web server to deliver new code to the web browser which might be compromised.

In the preferred embodiment, the following cryptographic primitives are used to implement the system and method of the present invention: Elliptic Curve Diffie—Hellman key agreement protocol (ECDH), Elliptic Curve Digital Signature Algorithm (ECDSA), Authenticated Encryption scheme-Galois/Counter Mode (AES-GCM) symmetric encryption, the SHA256 hashing algorithm, and the PBKDF2 password-based key derivation function. All client-side scripting is implemented using Javascript, and all client-side cryptography is implemented using the Web Crypto API.

To use the system and method of the present invention (e.g., to register for the service of the system and method of the present invention (hereinafter "service" or "EncryptedSend.com" as used in several of the Figures), or to send an encrypted message through the service, or to receive encrypted messages through the service), a user must first point their web browser to a URL where the service is hosted. Upon doing so, the user's browser downloads several .html, .css, and .js files from the web server (e.g., see FIGS. 1A-9). These files define a single persistent web page which remains loaded in the user's web browser throughout the duration of the user's session with the service. The .html and .css files contain code that is used to present the user interface to the user, in order for the user to interact with the service. The j s files contain client-side scripting that runs within the user's web browser and performs three functions: First, the client-side scripting performs all client-side cryptography operations. Secondly, the client-side scripting interacts with the server by way of an API hosted by the server. Third, the client-side scripting manages the user interface by displaying and hiding various elements of the user interface as needed, in order to present the user with the elements needed for the operation that the user is performing at any given time.

One of the objectives of the present invention is to mitigate a potential security vulnerability stemming from the possibility of malicious client-side scripting. One skilled in the art will notice that a conventional web browser application is potentially vulnerable to a malicious scripting attack targeting the set of files that define the web page which are downloaded from the web server to the user's web browser (see FIG. 10). If the operator of the service, or an attacker that is able to compromise the web server, were to exploit the system by inserting malicious code in one or more of these files, then he/she may be able to capture sensitive information sent or received by the user through the system in unencrypted form, or capture the user's private key. As such, Applicant has identified a solution to this potential security vulnerability, namely, the performance of a cryptographic analysis on one or more the files downloaded from the web server in conjunction with a cryptographic value obtained from a trusted source (e.g., a trusted third party verifier, a trusted signer, etc.). The cryptographic analysis is performed to verify the integrity of the set of files in order to warn the user of a possibly compromise of these files before the user exposes any sensitive information to potentially malicious client-side scripting in these files. As one skilled in the art would also recognize, a cryptographic analysis encompasses a variety analyses which may include hashing, digital signatures, public key cryptography, etc., and which are discussed in more detail below. Moreover, this cryptographic analysis can be conducted by the user himself/herself or by the user's web browser.

Applying the foregoing cryptographic analysis with other unique features of the present invention, namely, the generation of the set of files that define a single persistent web page and preventing the web page from being refreshed during the user's session, results in another solution to a malicious scripting attack targeting the set of files.

Figure 10:
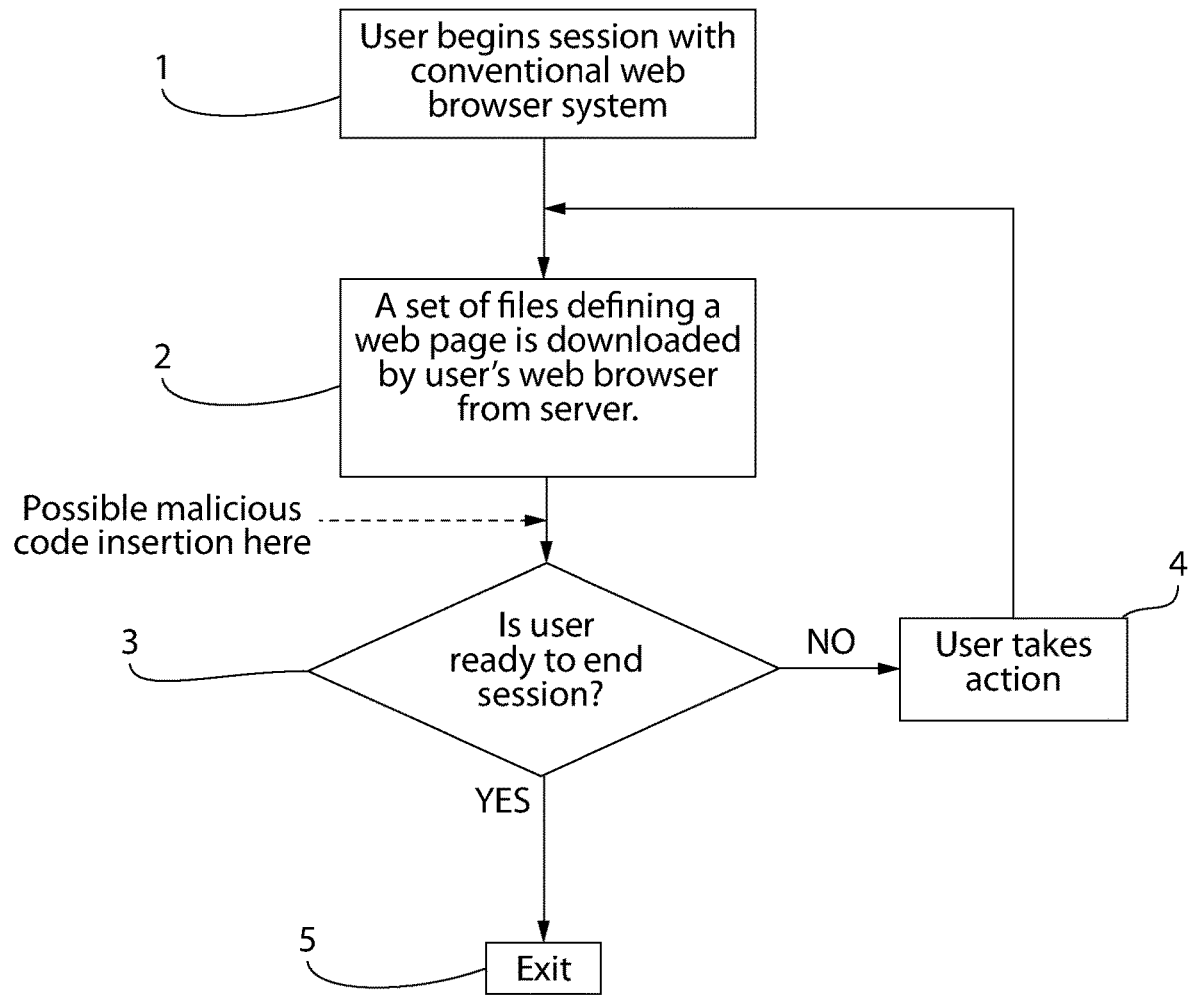
FIG. 10 shows the operation of a conventional web application.
Figure 11:
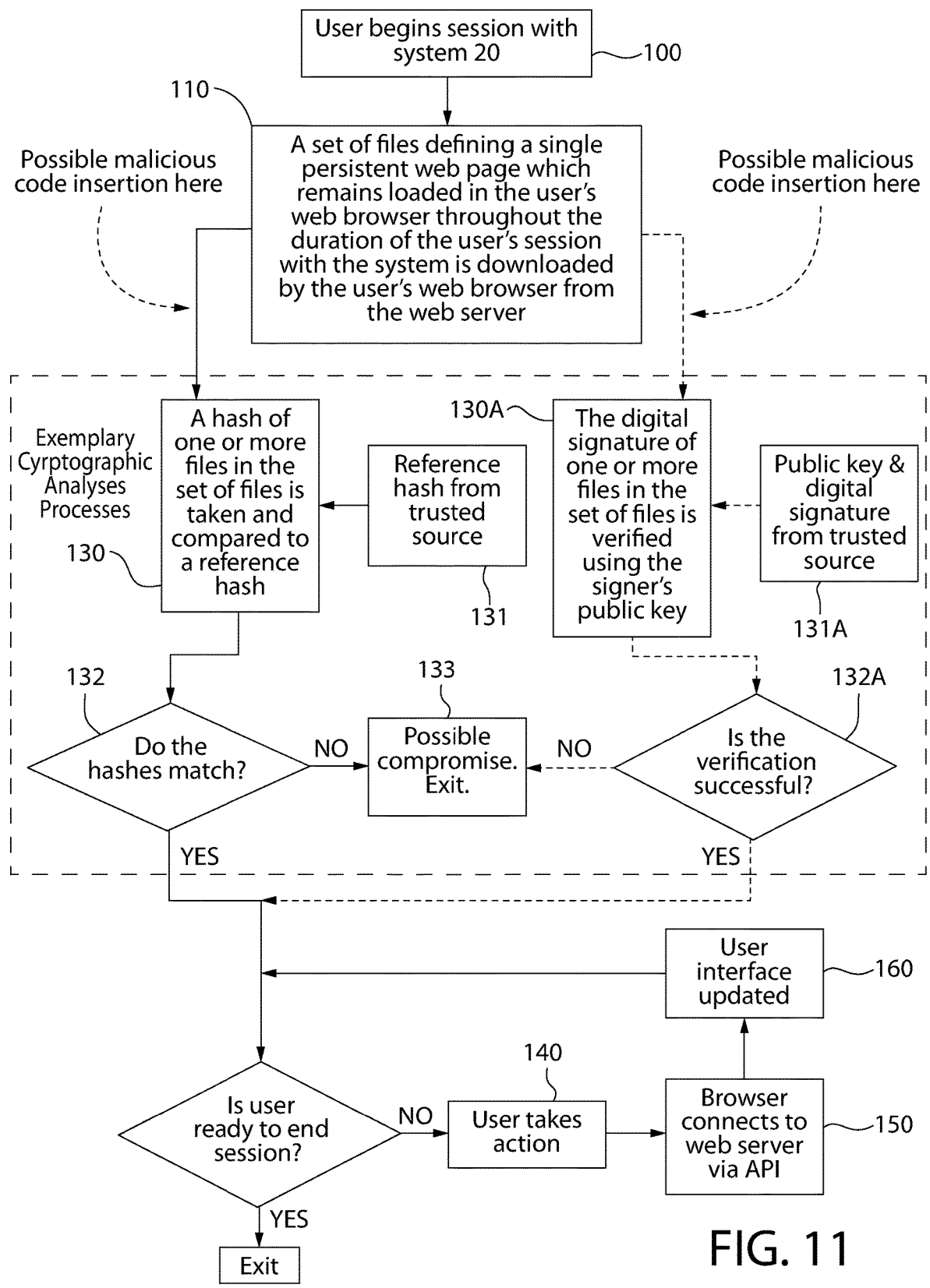
FIG. 11 shows the operation of the system/method of the web page download, integrity verification, and web page persistence disclosed herein.

The potential for a malicious scripting attack, like the one described above, is the reason for the design of the system and method disclosed herein and shown in FIG. 11, where a set of files defining a single persistent web page is downloaded by the user's web browser from the server at the start of the session (FIG. 11, block 100), and the web page defined by this set of files remains loaded in the user's web browser throughout the duration of the user's session with the service (FIG. 11, block 110). This is in contrast to the design typically used in web applications, as shown in FIG. 10, where a new web page is dynamically generated by the web server and downloaded by the user's web browser from the web server after each action by the user (FIG. 10, blocks 1-5), replacing the previously loaded web page. In contrast, in the present system and method, at no point during the user's session is a full page refresh done; instead client-side scripting associated with the single persistent web page instructs the web browser to interact with the user (FIG. 11, block 140), and the web server through an API (FIG. 11, block 150), and to display updated information retrieved by the user's web browser from the web server (FIG. 11, block 160) as the user interacts with the system. The objective of this design is to provide the user with a means to mitigate a potential malicious scripting attack. To protect himself/herself from this threat, it is necessary for the user to ensure the integrity of this set of files only once (FIG. 11, block 130), at the beginning of the session—not repeatedly throughout the session as would be necessary after each full-page refresh with a conventional system. Therefore, at the beginning of the user's session, if the user is able to verify the integrity of the set of files that define the single persistent web page which remains loaded in the user's web browser throughout the duration of the user's session with the service, through the use of a cryptographic analysis based on reference cryptographic values as described herein, then this is sufficient to protect himself/herself from a malicious scripting attack throughout their session with the service. Such verification would be impossible with a conventional system, where a new web page is dynamically generated by the web server and downloaded by the user's web browser from the web server after each action by the user, because reference cryptographic values for these dynamically generated pages would be unavailable.

One method of ensuring the integrity of one or more files in the set of files that defines a web page is to take a cryptographic hash of the file(s), and compare this hash value to a reference hash value of one or more known safe files. This exemplary cryptographic analysis is set forth in steps 130, 131, 132 and 133 in FIG. 11. Users can perform this procedure manually by using the 'save page as' function in their web browser, or the developer tools interface in their web browser, to save one or more of the currently loaded files to their system. Then, the user can use a program (such as openssl) to take a cryptographic hash of the file(s), then compare this hash to a reference hash of one or more known safe files, perhaps obtained from a trusted third party verifier.

In addition, another exemplary cryptographic analysis is set forth in steps 130A, 131A, 132A and 133 in FIG. 11. In particular, this method ensures the integrity of one or more files in the set of files that defines a web page by seeking to verify a cryptographic digital signature over the file(s) made by a trusted signer.

Even further, the process of ensuring the integrity of one or more files in the set of files that defines a web page using one of the cryptographic methods described above can be automated by the user's web browser, by computer code embedded in the user's web browser or a web browser plug-in that obtains the necessary reference cryptographic values from a trusted source, and performs the verification, and advises the user if the verification passed (indicating that the integrity of the file(s) is intact) and/or advises the user if verification failed (indicate that the file(s) may have been compromised).

Moreover, the task of ensuring the integrity of a set of files that define a web page can be simplified by utilizing subresource integrity in the root document for references to all supporting files in the set of files. If subresource integrity is used in the root document in references to all supporting files, then ensuring the integrity of the root document via one of the procedures described above also ensures the integrity of all supporting files, as any change to any supporting file would necessitate a change to its reference in the root document as well, otherwise the change would be detected by the browser when enforcing subresource integrity.

It is also contemplated that the threat of malicious code being inserted into one or more files in the set of files downloaded by the user's web browser from the web server can be further mitigated through the use of a strict content security policy. Furthermore, it is contemplated that one aspect of the task of ensuring the integrity of the set of files defining a web page might involve ensuring that the web page defined by this set of files is not capable of requesting a new web page that the browser would load in place of itself.

FIG. 1A shows the process of sending an encrypted message over the Internet 10 to a recipient through the system 20 (FIG. 1C). To send a message to a recipient, the sender first points their web browser to the web server 22, to a unique URL for the recipient. Upon doing so, the user's browser downloads the .html, .css, and .js files which define the single persistent web page which remains loaded in the user's web browser throughout the duration of the user's session with the service. Client-side scripting running within the user's web browser presents the form shown in FIG. 5, for composing a message. In addition, the recipient's certificate is downloaded from the server to the sender's web browser through the API. As shown in FIG. 4B, the recipient's certificate contains the recipient's identifying information and the recipient's public ECDH key, and is digitally signed by both the recipient and the server. These signatures are verified by client-side scripting running within the sender's web browser. The recipient's signature is verified using the recipient's public key contained in the certificate, and the server's signature is verified using the server's public key hardcoded in the client side scripting. After composing a message to the recipient (optionally including one or more attached files) the client-side scripting running within the sender's web browser then uses ECDHE to derive a symmetric encryption key, based on the recipient's public key. The message is then encrypted using the derived key, then the encrypted message is uploaded by the sender's web browser to the server through an API.

FIGS. 1B-1 and 1B-2 shows the process of receiving an encrypted message over the Internet from a sender through the system 20 (FIG. 1C). To retrieve a message, the recipient first points their web browser to the server 22, to a URL for the service. Upon doing so, the user's browser downloads the .html, .css, and .js files which define the single persistent web page which remains loaded in the user's web browser throughout the duration of the user's session with the service. Client-side scripting running within the user's web browser presents the form shown in FIG. 7, for beginning a session with the system. The recipient then provides his/her secret key file and password. The format of the user's secret key file can be seen in FIG. 4A. At this point, the client-side scripting derives a decryption key from the password using PBKDF2 with the number of rounds specified in the secret key file. The user's encrypted ECDH private key is then extracted from the secret key file, and the decryption key derived from the password is then used to decrypt the user's ECDH private key. The private key is stored in a Web Crypto API CryptoKey object, with the .extractable property set to false. This enables the user's private key to be used to sign messages or derive symmetric keys, but prevents the private key from being read for the remainder of the user's session. Client-side scripting running within the user's web browser then performs a query to the server through an API to request user account information for the recipient. An authentication process then commences between the web browser and the server, via the API, to ensure that the recipient is in possession of the private key corresponding to recipient's public key sent in the request. This process is carried out by way of a cryptographic process that enables the server to verify that the recipient is in possession of the private key, without the need for the recipient to disclose the private key to the server. Upon successful authentication, account information for the recipient is returned by the API, and this information is displayed for the user by client side scripting running within the user's web browser. The user can then request to view a log of messages received. Client-side scripting running within the user's web browser then performs a query to the server through an API to request a log of messages received. An authentication process similar to the one described above commences. Upon successful authentication, metadata for each message is returned by the API, along with the encrypted subject, message text, and list of attachments for each message. Client-side scripting running within the recipient's web browser then decrypts the subject and message text of each message using the recipient's private key to derive the symmetric encryption key used by the sender to encrypt these parts. Then, metadata for each message is displayed, along with the decrypted subject, message text, and list of attachments for each message.

At this point, the user can request a file attached to a message. Client-side scripting running within the recipient's web browser then requests the encrypted attachment from the server via the API. An authentication process similar to the one described above commences. Upon successful authentication, the requested encrypted message part is returned by the API, and client-side running within the recipient's web browser decrypts the file and makes the file available to the recipient to open or save.

FIGS. 2A-2D show the architecture of the API hosted by the server. Client-side scripting running within users' web browsers accesses the API through an SSL/TLS connection over HTTPS, using the browser's built-in XMLHttpRequest request (XHR) object. The API allows client web browsers to send requests and commands to the server needed to support system functions such as registering for the service, requesting certificates of other users of the system, enabling senders to upload encrypted messages for recipients, accessing logs of messages sent and received, enabling recipients to download encrypted messages that they've received, etc.

Figure 2A:
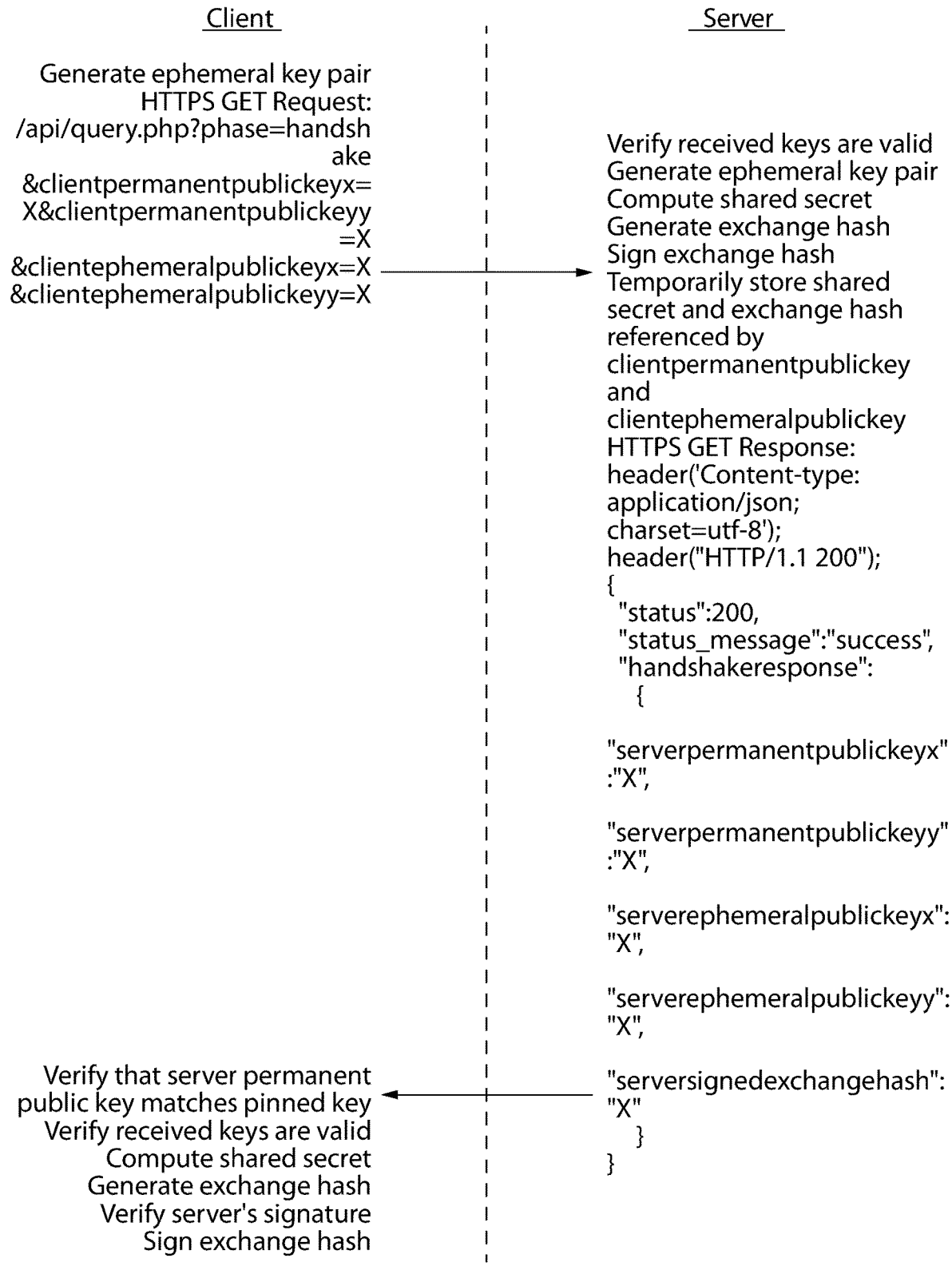
Figure 2B:
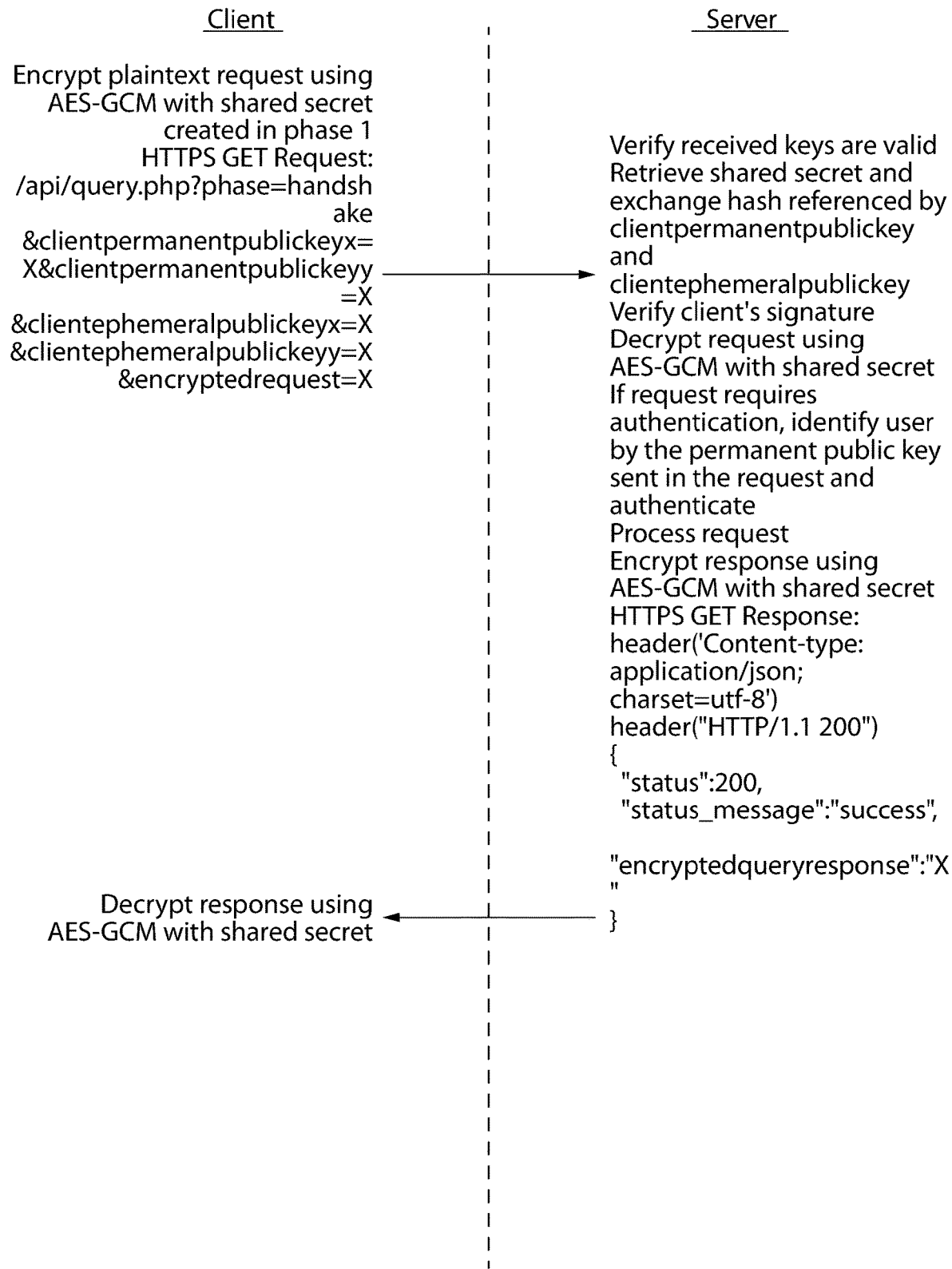
Figure 2C:
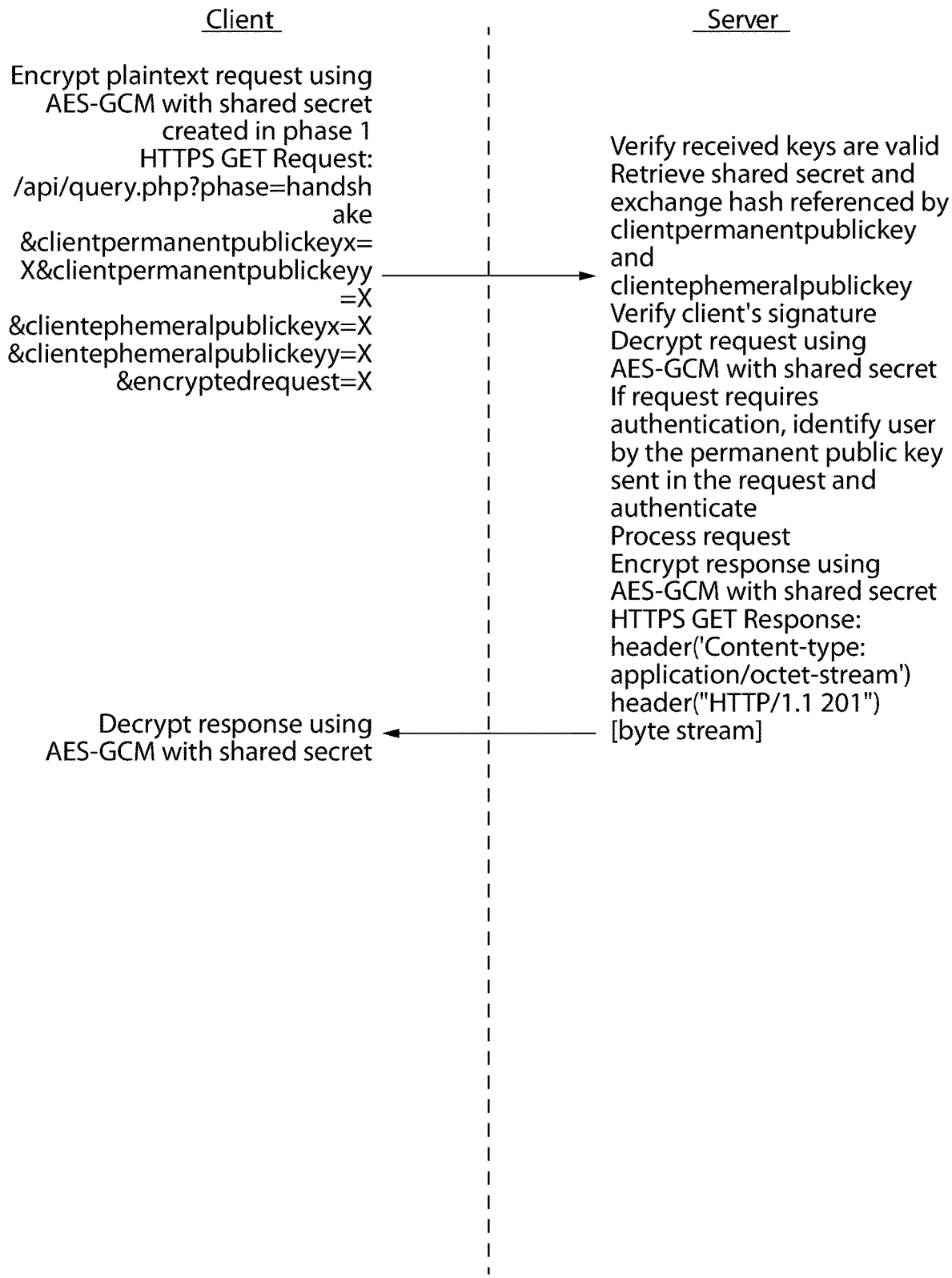
Figure 2D:
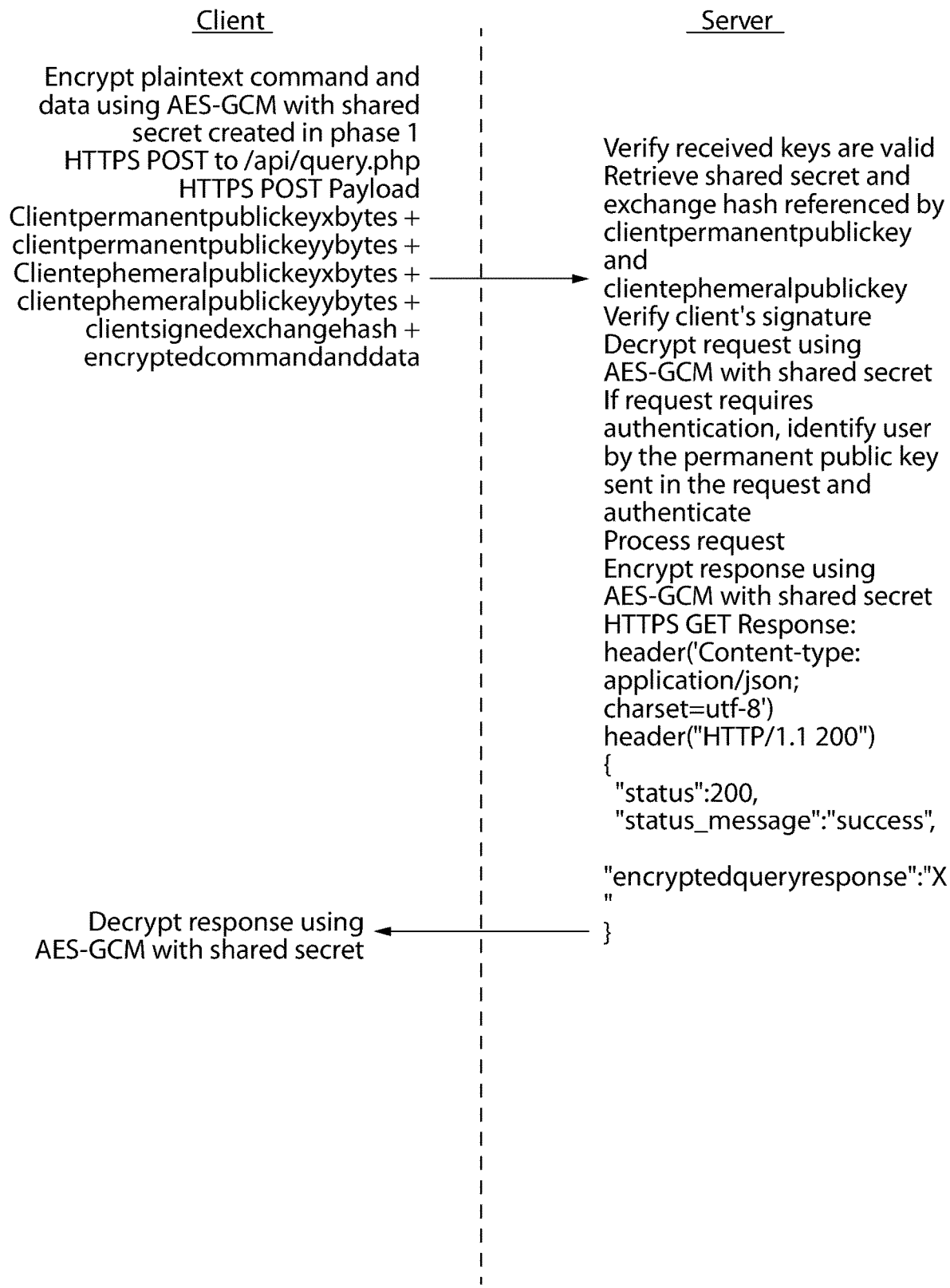

Each API operation consists of two phases, where each phase consists of an HTTPS round trip between the browser and the server. FIG. 2A shows phase 1 of an API operation. Phase 1 is the same for all API functions. At the conclusion of phase 1, the client and the server each have a mutually agreed upon ephemeral shared secret and exchange hash. The mutually agreed upon ephemeral shared secret and exchange hash derived in phase 1 are used in phase 2, where the client sends a request or command to the server, and the server returns a response. The procedure used in phase 2 depends on the nature of the request or command sent by the client to the server in phase 2. FIGS. 2B, 2C, and 2D show phase 2 of an API operation for various API functions. As can be seen in FIGS. 2A, 2B, 2C, and 2D, the API mutually authenticates the client and the server during each API operation, using a cryptographic schema involving the permanent keys for the client and the server, the ephemeral keys generated by the client and the server in phase 1, the shared secret derived by the client and the server in phase 1, and the exchange hash derived by the client and the server in phase 1. The ephemeral shared secret is derived from the client and server ephemeral keys in phase 1 using ECDHE. The exchange hash is derived in phase 1 using a SHA256 hash function over the client permanent public key, the server permanent public key, the client ephemeral public key, the server ephemeral public key, and the ephemeral shared secret. Digital signatures over the exchange hash by both the client and the server, each using their permanent private ECDH keys with ECDSA, are used to assure each party that the other is in possession of the permanent private key corresponding to the permanent public key provided in phase 1, without the need for either party to disclose their permanent private key to the other. Thus, the client is able to verify that the server is in possession of the permanent private ECDH key corresponding to a known pinned public key for the server in phase 1, and the server is able to verify that the client is in possession of the permanent private ECDH key corresponding to public key on record for that client in phase 2. The server uses memory to store the shared secret and exchange hash (indexed by the client's permanent public key and ephemeral public key provided by the client in phase 1) for the short duration between the two phases comprising an API request. However, no state information is stored on the server after the completion of an API request. Some API functions (such as retrieving messages for a recipient) require the client to authenticate, while others (such as registering for the service) do not require the client to authenticate. For operations that require the client to authenticate, the user is identified at this point by the permanent public ECDH key presented in the request, so that the user can be authenticated. For operations that do not require the client to authenticate, the same process is used, except that the client may use a randomly generated ECDH key pair in place of the permanent key pair, and the server does not attempt to identify or authenticate the client for these operations. In addition to the authentication function performed by the API, all requests and responses sent between client web browsers and the server through the API during phase 2 are encrypted using AES-GCM with the ephemeral shared secret derived from the client and server ephemeral keys in phase 1. This ensures secrecy, authenticity, and integrity of requests and responses between client web browsers and the server during phase 2. Therefore, all communications between client web browsers and the server are 'double encrypted', first by the API, then secondly by the SSL/TLS channel. In addition, perfect forward secrecy is guaranteed, because the ephemeral shared secret used for AES-GCM by the API in phase 2 is derived from the ephemeral keys. The schema used by the API is also resistant to replay attacks.

FIGS. 2E-1 through 2E-3 show a list of the functions supported by the API. Functions that execute queries are generally done using HTTPS GET requests in phase 2, and results of queries are returned in a JSON formatted response, as shown in FIG. 2B. Functions that retrieve parts of messages are generally done using HTTPS GET requests in phase 2, and encrypted truncated message payloads are returned as binary data, as shown in FIG. 2C. Functions that execute commands are generally done using HTTPS POST requests in phase 2, and results of commands are returned in a JSON formatted response, as shown in FIG. 2D. For both phase 1 and phase 2 of an API operation, the server returns a 2xx status code in the HTTPS response header to indicate success, and a 4xx status code in the HTTPS response header to indicate a failure. These same status codes are included in the JSON response as well for phase 1 and phase 2 in cases where a JSON response is returned, along with more detailed status messages, as can be seen in FIGS. 2B and 2D.

In order to receive messages through the system, a user must first register for the service and complete a setup process. FIGS. 3A-3C show the steps involved in the setup process. To register for the service, the user first points their web browser to a URL on the server where the service is hosted. Upon doing so, the user's browser downloads the html, .css, and.j s files which define the single persistent web page which remains loaded in the user's web browser throughout the duration of the user's session with the service. Upon selecting an option to register for the service, client-side scripting running within the user's web browser presents the form shown in FIG. 3A. After providing their name, company (optionally), and email address in the form in FIG. 3A, the user then proceeds to the form in FIG. 3B where they enter a passphrase. At this point, client-side scripting running within the user's web browser then generates a random ECDH key pair for the user using the P-256 elliptical curve. Next, a PBKDF2 function with one million iterations of SHA256 hashing is used to derive a 256-bit AES-GCM encryption key from the user's passphrase. This key is then used with an AES-GCM function to encrypt the user's ECDH private key. The encrypted ECDH private key is stored in the secret key file, along with the supporting information shown in FIG. 4A.

In addition to the secret key file being generated for the user, a certificate is also generated for the user. As shown in FIG. 4B, the certificate is created in JSON format, and contains the user's first name, last name, company, email address, creation date, version information and ECDH public key. The certificate is then self-signed by the user, using the user's ECDH private key with ECDSA. This signature can later be verified to prove that the user was in possession of the private key corresponding to the public key contained in the certificate when the certificate was signed by the user. This verification procedure is also shown in FIG. 4B.

In FIG. 3C, the user is then prompted to save the secret key file to their system. After saving the secret key file, the user's web browser executes a 'register1' API call to the server, passing the user's certificate that was created in the previous step. The server then verifies that the public key contained in the certificate is valid, that the creation date is within a given tolerance of the current date and time, and that the user's self-signed signature is valid given the user's public key contained in the certificate. If all checks pass, the server then sends an email to the user containing a verification URL. The verification URL contains the user's certificate passed in the 'register1' API call, encrypted using AES-GCM with a key known only to the server. The user is then presented with a message notifying them that a verification email has been sent to the address that they provided in the form of FIG. 3A. The user then receives a verification email, containing the verification URL. Upon accessing the verification URL, the user's web browser loads client-side scripting which then executes a 'register2' API call to the server, passing the AES-GCM encrypted certificate contained in the verification URL sent in the verification email previously by the 'register1' operation. The server then attempts to decrypt the encrypted certificate. If successful, the server then performs the same set of verification steps described above during the response to the 'register1' API call. If decryption was successful and all verification checks pass, then this ensures that the individual claiming to have the name and company affiliation appearing in the certificate is in possession of the private key corresponding to the public key in the certificate, and was able to access a verification URL sent by email from the system to the email address in the certificate. At this point, the server signs the certificate using the server's ECDH private key with ECDSA, and this signature is appended to the certificate. Then, a database record is created for the user, containing information from the certificate, and the certificate itself. At this point, the user is presented with a message advising the user that the setup process is complete and that the account is active. The user is also provided with a URL that they can then provide to their senders, where senders can access a form to send encrypted messages to the user. The user also receives an email from the system containing the same information. Going forward, the user's encrypted private ECDH key contained in the secret key file that the user created during the setup process is used to authenticate the user with the system, and is used to decrypt messages that the user receives through the system.

As noted previously, FIG. 5 shows a form that is used by a sender to send an encrypted message to a recipient via the process shown in FIG. 1A. After composing a message to the recipient (optionally containing one or more attached files) client-side scripting running within the user's web browser creates a payload file containing the encrypted message, as per the format shown in FIG. 6, using the procedure in the following paragraph.

As shown in FIG. 6, the payload file consists of four segments: metadata, the parts data cipher, the signed header, and the payload cipher bytes. To create the payload file, first ECDHE is used to derive a 256-bit symmetric AES-GCM encryption key based on the sender's private ECDH key and the recipient's public ECDH key. If the sender has not authenticated with the system, then a random ECDH key pair is generated for the sender to use for the ECDHE process. Next, the first 144 bytes of metadata is generated, including the sender and recipient X and Y public ECDH key values. Next, the parts data is collected, as shown on the left of FIG. 6. Each message consists of N parts. The subject of the message is indexed as part 0, the text of the message is indexed as part 1, then any attached files are indexed from part 2 to part N-1. The parts data consists of the name, mime type, SHA256 hash of each part. Each part is encrypted using AES-GCM with the derived key. Next, the parts data cipher is generated using AES-GCM with the derived key to encrypt the parts data. The length (in bytes) of the parts data cipher is then appended to the metadata, followed by 64 (the length, in bytes, of an ECDSA signature). Next, the length (in bytes) of each encrypted message part is appended to the metadata, followed by four zero bytes to mark the end of the metadata. Next, the signed header is generated using ECDSA to create a digital signature over the metadata and the parts data, using the sender's private key. The payload file is then constructed as shown in FIG. 6 by appending the metadata, the parts data cipher, the signed header, and each encrypted message part. This payload file is then uploaded to the server using the postmessage' API call. The payload file is then stored on the server. The server then parses the metadata of the payload file to capture the public keys of the recipient and sender, and uses these keys to identify the account records of the recipient and sender (if possible). A record for the message is stored in the database consisting of a unique identifier for the message, a pointer to the recipient, and pointer to the sender (if known), the message size (in bytes), and the timestamp. Finally, the server (optionally) notifies the recipient that they've received a message through the system.

As noted previously, FIG. 7 shows a form that can be used by a registered user to begin a session with the system and authenticate with the system via the process shown in FIGS. 1B-1 through 1B-2. After successfully authenticating, the user's private key is stored securely in a Web Crypto API CryptoKey object, and is used to commence API calls to the server such as those shown in FIGS. 2E-1 through 2E-3 via the procedures shown in FIGS. 2A, 2B, 2C, and 2D, in order to facilitate further operations. At this point, the user's web browser executes a 'getaccountrecord' API call to the server, and the information returned by the API is used to present the user with general account information, as shown in FIG. 8. The user is also presented with options to view account information, views logs of messages sent and received, and send a message.

FIG. 9 shows a log of messages received by the user through the system. After beginning a session with the system as described above, and selecting the option to view received messages, client-side scripting running within the user's web browser executes a getmessages' API call to the server, with the string 'received' as the input parameter. The server queries the database to get the message id, sender's name (if known) and timestamp of each message, and this information is returned by the API, and used to populate the log of messages received as shown in FIG. 9. The process is similar for viewing a log of messages sent, except the string 'sent' (instead of 'received') is used as the input parameter to the 'getmessages' API call to the server.

Some of the pieces of information shown in the logs of messages presented to the user are not returned by the getmessages' API call. For example, this is the case with the subject of each message, the text of each message, and the names of any files attached to each message. These pieces of information come from the encrypted message payloads, not the 'getmessages' API call. To present these pieces of information, client-side scripting running within the user's web browser executes a 'getmessagepart' API call to the server for each message appearing in the log, passing the message id and the index of the requested part number as inputs. Using the metadata in the encrypted payload file of the message, the server parses the encrypted payload file to determine the indexes of the starting and ending bytes of each encrypted part in the encrypted payload file. The getmessagepart' API call returns a truncated encrypted payload file, including the metadata, the parts data cipher, the signed header, and the payload cipher bytes for parts 0 and 1, and the payload cipher bytes for any part requested with index 2 or greater, without the payload cipher bytes for any parts that were not requested with index 2 or greater. Client-side scripting running within the user's web browser then derives the symmetric AES-GCM key used to encrypt the encrypted parts of the truncated encrypted payload file, using ECDHE with the recipient's private ECDH key and the sender's public ECDH key contained in the metadata of the truncated encrypted payload file. Using the derived key, client-side scripting running within the user's web browser then decrypts the requested part from truncated encrypted payload file, using the derived key, through the inverse of the process used to create the encrypted payload file. This decrypted information is then used to populate the subject and text for each message shown in the message logs, and is also used to show a list of any files attached to the message.

If a user requests a file attached to a message, client-side scripting running within the user's web browser executes a 'getmessageparf' API call to the server, passing the message id and the index of the attachment. This truncated encrypted payload file returned by the 'getmessageparf' API call, containing the encrypted file requested by the user, is then decrypted by client-side scripting running within the user's web browser, using the same process described in the previous paragraph, and the user is given the option to open or save the file.

As noted previously, numerous specific details set forth herein illustrate the applicant's best mode for practicing the invention and enabling one of ordinary skill in the art to make and use the invention. It should be understood that the preceding are examples only of implementing the system and method of the present invention and are not meant to limit the invention to only these embodiments. For example, other methods of specifying a recipient of an encrypted message are contemplated, in addition to the one described herein, where the first few bytes of X value of the recipient's ECDH public key are encoded in the unique URL for the recipient. Methods involving schemes where recipients are identified by friendly usernames or addresses are contemplated. As another example, other methods of storing users' private keys are contemplated, in addition to the one described herein, where users' private keys are encrypted using a key derived from a password, and stored in a file. Methods involving schemes where users private keys are derived directly from a password using a password based key derivation function, or stored on a trusted platform module, are contemplated.

In addition, it should be noted that users must trust the system to authenticate, via the procedure described in the registration process, that the certificates and/or public keys of other users in fact belong to those users. Users may also validate the authenticity of other users' certificates and/or public keys via some out-of-band process, such as telephone, SMS, fax, etc.

Finally, it should be noted that the methods described herein for securely implementing cryptography using client-side scripting running in a web browser that originates from an untrusted server through the use of a persistent web page and/or verifying the integrity of a set of files that define a web page can be applied not only to the system described herein (for encrypted messaging), but also to any browser-based system where the user is sending or receiving or managing sensitive information—including (but not limited to) browser-based systems for handling crypto-currencies, browser-based systems for encrypted cloud-based file storage, browser-based authentication systems, etc.

While the invention has been described in detail and with reference to specific examples thereof, it will be apparent to one skilled in the art that various changes and modifications can be made therein without departing from the spirit and scope thereof.

What is claimed is:

1. A method for implementing web browser based end-to-end encryption between a first device associated with a sender and a second device associated with a recipient over internet, said method comprising:
running a first web browser on said first device associated with the sender;
downloading, by said first web browser, a first set of files that defines a first web page, wherein said first set of files contains code for presenting a form for composing a message, and wherein said first set of files contains a first client-side scripting for implementing message encryption;
composing, by said sender, the message using said form;
executing, by said first web browser, said first client-side scripting to:
encrypt said message composed by said sender, and
upload said encrypted message to a server;
running a second web browser on said second device associated with the recipient;
downloading, by said second web browser, a second set of files that define a second web page, wherein said second set of files contains code for displaying messages, and wherein said second set of files contains a second client-side scripting for implementing message decryption;
executing, by said second web browser, said second client-side scripting to:
download said encrypted message from said server,
decrypt said encrypted message, and
display said decrypted message,
said method further comprising:
verifying, by the first web browser, integrity of a root document of said first set of files by performing a cryptographic analysis of said root document in conjunction with a cryptographic value obtained from a trusted source.

2. The method of claim 1, wherein:
said cryptographic value includes a reference hash; and
said performing a cryptographic analysis on the root document in said first set of files in conjunction with said cryptographic value includes deriving a hash of the root document in said first set of files and comparing said derived hash with said reference hash; and
said verifying the integrity of said root document of said first set of files only upon confirmation by said cryptographic analysis, where said confirmation includes confirming that said derived hash matches said reference hash.

3. The method of claim 1, wherein:
said cryptographic value includes a public key and a digital signature; and
said performing a cryptographic analysis of the root document in said first set of files in conjunction with said cryptographic value includes verifying said digital signature of the root document in said first set of files using said public key; and
said verifying the integrity of said first set of files only upon confirmation by said cryptographic analysis includes confirmation only upon verification of the digital signature.

4. A method of verifying integrity of a root document in a set of files that define a web page, where said root document is downloaded from an untrusted web server to a user's web browser running on a computer that prevents entry of malicious code into said root document, said method comprising:
providing said root document and making said root document available for download from said untrusted web server;
downloading, by said user's web browser, said root document from said untrusted web server;

obtaining, by said user's web browser, a cryptographic value from a trusted source, where said cryptographic value includes a reference hash;

performing, by said user's web browser, a cryptographic analysis of the root document in conjunction with said cryptographic value, where said cryptographic analysis includes deriving a hash of the root document and comparing the derived hash with the reference hash; and verifying, by said user's web browser, the integrity of said root document only upon confirmation by said cryptographic analysis, where said confirmation includes confirming that the derived hash matches the reference hash.

5. A system that enables web browser-based end-to-end encryption of messages and files, said system comprising:

a first computer associated with a sender;

a second computer associated with a recipient;

a first web browser running on said first computer associated with the sender, wherein said first web browser downloads a first set of files that defines a first web page, wherein said first set of files contains code for presenting a form for composing a message and wherein said first set of files contains a first client-side scripting for implementing message encryption;

said sender composes the message by using said form;

said first web browser executes said first client-side scripting to encrypt said message composed by said sender and to upload said encrypted message to a server;

a second web browser running on said second computer associated with the recipient, wherein said second web browser downloads a second set of files that defines a second web page, wherein said second set of files contains code for displaying messages and wherein said second set of files contains a second client-side scripting that downloads said encrypted message from said server and decrypts said encrypted message and displays said decrypted message;

said first set of files comprising a root document, wherein said system verifies integrity of said root document by performing a cryptographic analysis of said root document in conjunction with a cryptographic value obtained from a trusted source.

6. The system of claim 5, wherein said cryptographic value comprises a reference hash and wherein said cryptographic analysis comprises deriving a hash of said root document in said first set of files and comparing said derived hash with said reference hash and wherein the integrity of said first set of files is verified only when said derived hash matches said reference hash.

7. The system of claim 5, wherein said cryptographic value comprises a public key and a digital signature and wherein said cryptographic analysis comprises verifying said digital signature of said root document of said first set of files using said public key and verifying the integrity of said first set of files only upon confirmation of the verification of the digital signature.

8. A system for verifying integrity of a root document in a set of files that define a web page, where said root document is downloaded from an untrusted web server to a web browser that prevents entry of malicious code into said root document, said system comprising:

a computer associated with a user;

a root document that is made available for download from said untrusted web server;

a user's web browser, running on said computer, that downloads said root document from said untrusted web server;

a cryptographic value that is obtained, by said user's web browser, from a trusted source, where said cryptographic value comprises a public key and a digital signature; and wherein the integrity of said root document of said set of files is verified by performing a cryptographic analysis on said root document, where said cryptographic analysis comprises verifying said digital signature of said root document by using said public key, wherein said user's web browser performs said cryptographic analysis and verify the integrity of said root document.

9. A system for verifying the integrity of a root document in a set of files that define a web page, where said root document is downloaded from an untrusted web server to a user's web browser that prevents entry of malicious code into said root document, said system comprising:

a computer associated with a user;

said root document that is made available for download from said untrusted web server;

said user's web browser, running on said computer, that downloads said root document from said untrusted web server;

a cryptographic value that is obtained, by said user's web browser, from a trusted source, where said cryptographic value includes a reference hash; and wherein the integrity of said root document is verified by performing a cryptographic analysis on said root document, where said cryptographic analysis comprises deriving a hash of the root document and comparing the derived hash with the reference hash; and wherein said user's web browser verifies the integrity of said root document only upon confirmation by said cryptographic analysis that the derived hash matches the reference hash.

10. A method for verifying the integrity of a root document in a set of files that define a web page, wherein said root document is downloaded from an untrusted web server to a user's web browser that prevents entry of malicious code into said root document, said method comprising:

providing said root document and making said root document available for download from said untrusted web server;

downloading, by said user's web browser, said root document from said untrusted web server;

obtaining, by said user's web browser, a cryptographic value from a trusted source, where said cryptographic value comprises a public key and a digital signature;

performing, by said user's web browser, a cryptographic analysis of said root document in conjunction with said cryptographic value, where said cryptographic analysis comprises verifying said digital signature of said root document by using said public key; and verifying, by said user's web browser, the integrity of said root document by verifying said digital signature of said root document using said public key.

* * * * *